UNITED STATES PATENT OFFICE.

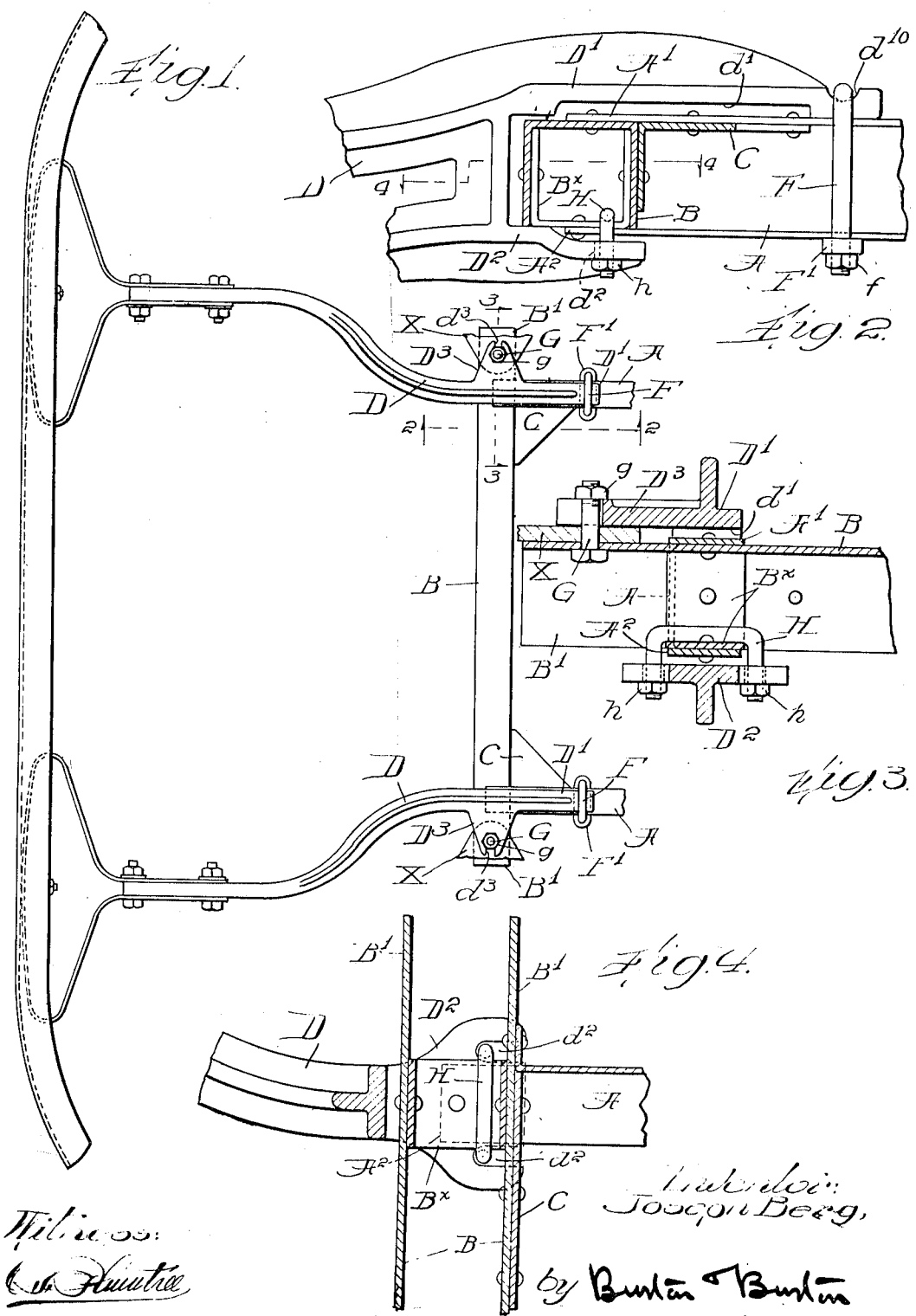

JOSEPH BERG, OF CHICAGO, ILLINOIS, ASSIGNOR TO STEWART-WARNER SPEEDOMETER CORPORATION, OF CHICAGO, ILLINOIS, A CORPORATION OF VIRGINIA.

AUTOMOBILE-BUMPER SUPPORT.

1,273,450. Specification of Letters Patent. Patented July 23, 1918.

Application filed October 1, 1917. Serial No. 194,216.

*To all whom it may concern:*

Be it known that I, JOSEPH BERG, a citizen of the United States, residing at Chicago, in the county of Cook and State of Illinois, have invented new and useful Improvements in Automobile-Bumper Supports, of which the following is a specification, reference being had to the accompanying drawings, forming a part thereof.

The purpose of this invention is to provide an improved construction for a bumper-supporting bracket for vehicles such as automobiles. It consists in the elements and features of construction shown and described as indicated in the claims.

In the drawings:—

Figure 1 is plan view of the rear portion of an automobile frame equipped with a bumper embodying this invention.

Fig. 2 is a side elevation of the bumper bracket and the vehicle frame to which it is attached.

Fig. 3 is a section at the line, 3—3, on Fig. 1.

Fig. 4 is a section at the line, 4—4, on Fig. 2.

In the drawings, A, A, are the side bars of an automobile frame, the particular type being that of the Ford car. B is the rear cross bar. This cross bar is shown connected to the side bar in the usual manner of the Ford car frame construction, said cross bar being a downwardly-open channel at the part where it crosses and is joined to the side bar, the side bar being a sidewardly-open channel of which the web is cut away for a short distance at the rear end, leaving the flanges extending above and below the cross bar, as seen at $A^1$ and $A^2$.

The upper flange extension, $A^1$, is riveted to the web of the channel, B, while the lower flange extension, $A^2$, is riveted to the web portion of a short channel section filler, $B^\times$, inserted in upwardly-open position in the downwardly-open channel, B, and extending lengthwise therein scarcely beyond the width of the side bar flanges, $A^1$ and $A^2$. The junction of the side bar, A, and cross bar, B, is further strengthened by a triangular bracket plate, C. The cross bar, B, projects laterally beyond the side bar as shown at $B^1$.

The bumper bracket which constitutes the present invention is shown at D. Its forward end is forked for engaging the vehicle frame, the upper fork arm, $D^1$, being extended across the cross bar, B, and forwardly thereof overhanging the side bar, A, said fork arm being cut away on its inner side as shown at $d^1$, to clear the heads of the rivets or bolts which secure the bar, A, to the angle brackets and to the cross bar, B, as described. Said upper fork arm, $D^1$, has a laterally-projecting lug, $D^3$, extending out over the projecting end portion, $B^1$, of the cross bar, B. Said lug has at the end a notch, $d^3$, by which it engages the bolt, G, which secures the vehicle body to the frame, said lug, $D^3$, thus intervening between the nut, $g$, and the body lug, X; and the three parts, the body, the bracket and the cross bar, are thus secured together by the same bolt, said bolt having been withdrawn to admit the bracket into place. At the forward end the fork arm, $D^1$, seats on the upper side of the side bar, A, and has on the under side a recess, $d^1$, to accommodate the heads of the bolts or rivets by which the parts of the frame are secured together, and at the upper side a recess, $d^{10}$, which forms a seat for the neck of a U-bolt, F, which strides the said fork arm and the side bar, A, and is secured by a cleat, $F^1$, and the usual nuts, $f$, at the lower end for clamping said forward end of the bracket arm, $D^1$, down onto the top of the side bar, A.

The lower fork arm, $D^2$, of the bracket, D, extends under the cross bar, $b$, and under the filler, $B^\times$; and a U-bolt, H, is provided, which may be inserted into the open end of the rectangular cavity formed by the downwardly-open channel bar and the upwardly-open filler, said U-bolt being positioned to stride the web of filler, $B^\times$, with its ends engaged in notches, $d^2$, at the forward end of the lower fork arm, $D^2$, so that nuts, $h, h$, applied to the downwardly-projecting ends of the U-bolts below said inner fork arm serve to clamp the latter firmly to the cross bar by clamping it to said filler.

I have shown and described this bumper bracket as applied for supporting a rear bumper, but in any instance in which the structure of the vehicle frame at the forward end is similar to that above described as existing at the rear end of the car, the bumper bracket of the form described would be equally applicable to the forward end of the car for supporting a front bumper.

I claim:

1. In combination with the side bar and cross bar of a vehicle frame, a bumper-supporting bracket forked at the inner end for engaging the cross bar of the frame, the upper fork arm being extended across said cross bar and above the side bar and clamped down to the latter at a considerable distance inward from the cross bar; a bolt securing the upper fork arm to the cross bar to take the thrust of the bumper.

2. In combination the side bar of a vehicle frame and a downwardly-open channel cross bar thereof, a bumper-supporting bracket forked at its inner end for engaging the cross bar, the upper fork arm being extended across the cross bar and above the side bar and clamped down to the latter; a bolt securing said upper fork arm to the web of the cross bar for taking the thrust of the bumper; a filler let into the channel of the cross bar and made rigid therewith, the lower fork arm of the bracket being extended under the bar and under said filler, and means for securing it to the latter.

3. In combination with a side bar of a vehicle and a downwardly-open channel cross bar thereof which projects outwardly beyond the side bar, a bumper-supporting bracket forked at the inner end for engaging the cross bar of the frame, the upper fork arm being extended above said projecting portion of the cross bar, and longitudinally across said cross bar to overhang the side bar, having its rear end clamped down to the latter; a bolt which secures the upper fork arm to the web of the channel cross bar at said projecting portion thereof, the lower fork arm extending under the the cross bar.

4. In combination with a side bar of a vehicle and a downwardly-open channel cross bar which projects outwardly beyond the side bar, a bumper-supporting bracket forked at the inner end for engaging the cross bar of the frame, the upper fork arm being extended across the cross bar to overhang the side bar, and the lower fork arm being extended under the cross bar; a bolt which secures the upper fork arm to the web of the channel bar to take the bumper thrust, and a U-bolt engaging the end portion of the upper fork arm for clamping it down onto the side bar.

5. In combination with a side bar of a vehicle and a downwardly-open channel cross bar thereof, a bumper-supporting bracket forked at the inner end for engaging the cross bar of the frame, the upper fork arm being extended across the cross bar, and above the side bar and clamped down thereto; a bolt which secures said upper fork arm rigidly to the web of the cross bar for taking the thrust of the bumper, the lower fork arm being extended under the channel cross bar; an upwardly-open channel filler inserted and secured in the downwardly-open channel of the cross bar, the lower fork arm of the bracket being extended under the cross bar and under said filler, and a U-bolt entered astride the filler and having its both ends projecting down past the filler and engaging said lower fork arm.

In testimony whereof, I have hereunto set my hand at Chicago, Illinois, this 25 day of September, 1917.

JOSEPH BERG.